United States Patent [19]

Akiyama et al.

[11] Patent Number: 4,749,725

[45] Date of Patent: Jun. 7, 1988

[54] PRODUCTION PROCESS OF PRE-FOAMED PARTICLES

[75] Inventors: Hiroyuki Akiyama, Hiratsuka; Takashi Kubota, Utsunomiya; Shigeru Okabe, Imaichi; Koji Iizuka, Utsunomiya; Hisao Tokoro, Kamikawachi, all of Japan

[73] Assignee: Japan Styrene Paper Corp., Tokyo, Japan

[21] Appl. No.: 829,990

[22] Filed: Feb. 18, 1986

Related U.S. Application Data

[63] Continuation of Ser. No. 738,983, May 29, 1985, abandoned.

[30] Foreign Application Priority Data

May 30, 1984 [JP] Japan ................................ 59-110073

[51] Int. Cl.$^4$ ................................................ C08J 9/22
[52] U.S. Cl. ........................................ 521/58; 521/56; 521/60; 521/146
[58] Field of Search ................ 521/56, 60, 146, 58

[56] References Cited

U.S. PATENT DOCUMENTS

| | | | |
|---|---|---|---|
| 2,857,341 | 10/1958 | Colwell et al. | 521/60 |
| 2,857,342 | 10/1958 | Platzer | 521/60 |
| 2,864,778 | 12/1958 | Mladinich | 521/60 |
| 2,911,381 | 11/1959 | Roth | 521/60 |
| 2,941,964 | 6/1960 | Houston | 521/93 |
| 2,941,965 | 6/1960 | Ingram | 521/56 |
| 2,962,456 | 11/1960 | Carlson, Jr. | 521/146 |
| 2,998,396 | 8/1961 | Nickolls | 521/60 |
| 3,069,367 | 12/1962 | Beaulieu | 521/146 |
| 3,072,581 | 1/1963 | Platzer | 521/146 |
| 3,351,569 | 11/1967 | Revallier et al. | 521/60 |
| 3,709,806 | 1/1973 | Minami et al. | 521/60 |
| 4,048,208 | 9/1977 | Spicuzza et al. | 521/60 |
| 4,448,901 | 5/1984 | Senda et al. | 521/58 |
| 4,464,484 | 8/1984 | Yoshimura et al. | 521/58 |

*Primary Examiner*—Morton Foelak
*Attorney, Agent, or Firm*—Sherman and Shalloway

[57] ABSTRACT

Pre-foamed particles are produced by dispersing resin particles, which contain nucleocells, in a dispersing medium in a closed vessel, heating the contents to a temperature of the softening point of the particles or higher and holding the contents at the temperature for a predetermined period of time while pressurizing the contents with an inorganic gas, and then opening the vessel at one end thereof so as to release the particles and medium into an atmosphere of a pressure lower than the internal pressure of the vessel, thereby causing the resin particles to foam. The above production process provides good pre-foamed particles with ease and without failure. It is also possible to avoid deleterious effects due to the swelling action of foaming agents.

19 Claims, No Drawings

PRODUCTION PROCESS OF PRE-FOAMED PARTICLES

This is a continuation of application Ser. No. 738,983, filed May 29, 1985, now abandoned.

This invention relates to a process for producing pre-foamed particles.

Foamed-in-place articles which are obtained by filling pre-foamed particles in molds and then heating the thus-filled particles to cause them to expand in the molds have been used for a wide range of applications such as heat-insulating materials, cushioning materials, packaging materials, buoyancy materials, etc.

These pre-foamed particles have conventionally been prepared, as described for example in Japanese Patent Publication No. 1344/1981, by dispersing resin particles, which contain a volatile organic solvent, in water in a closed vessel, heating the contents to a temperature of the softening point of the resin or higher while holding the internal pressure of the vessel at the vapor pressure of the foaming agent or higher, and then opening the vessel at one end thereof, said one end being lying under the water, to simultaneously release the resin particles and water from the vessel in to an atmosphere of a pressure lower than the internal pressure of the vessel. In this prior art process, propane, butane, heptane, hexane, cyclobutane, cyclopentane, trichlorofluoromethane, dichlorodifluoromethane or the like is used as the volatile organic foaming agent.

These volatile organic foaming agents however serve as good solvents for resins and cause resin particles to swell. They are thus accompanied by such drawbacks that the suitable foaming temperature range is narrow upon effecting the pre-foaming, the expansion ratio is significantly affected by the foaming temperature, and difficulties are encountered in controlling the expansion ratio. Besides, some of these volatile organic foaming agents are dangerous due to their toxicity or inflammability and even if some other volatile organic foaming agents are not accompanied by too much problems in terms of dangerousness, they are however too expensive. Additionally, these volatile organic foaming agents develop problems of environmental contamination such as destruction of the ozonosphere.

Despite the above-mentioned various problems of such volatile organic foaming agents, they are still continuously used because no effective foaming agent capable of replacing them has been developed.

With the foregoing in view, the present inventors have carried out an investigation for many years on pre-foamed particles useful in molding foamed-in-place articles. As a result, they succeeded in developing a novel production process which can produce with ease and good efficiency pre-foamed particles having excellent physical properties, leading to completion of this invention.

In one aspect of this invention, there is thus provided process for producing pre-foamed particles, which comprises:

dispersing resin particles, which contain nucleocells, in a dispersing medium in a closed vessel;

heating the contents to a temperature of the softening point of the resin particles or higher and holding the contents at the temperature for a predetermined period of time while pressurizing the contents with an inorganic gas; and opening the vessel at one end thereof so as to release the thus-heated and pressurized resin particles and dispersing medium into an atmosphere of a pressure lower than the internal pressure of the vessel, thereby causing the thus-heated and pressurized resin particles to foam.

The term "nucleocells" as used herein means cells which serve as nuclei for cells to be formed in pre-foamed particles. These nucleocells may be formed in resin particles by a variety of methods as will be mentioned next by way of example. Namely, it may be mentioned, upon extruding a resin through an extruder and then pelletizing the resultant extrudate to produce resin particles, (1) to knead a decomposable foaming agent together with the resin at a temperature of the decomposition temperature of the foaming agent or higher to decompose the foaming agent partly or in its entirety (2) to knead the resin and a volatile foaming agent so as to gasify the volatile foaming agent; (3) to add and knead a void-forming agent with the resin; (4) to add and knead pre-foamed particles or foamed articles with the resin; (5) to feed an inorganic gas such as air or nitrogen gas to a molten resin and then to knead the inorganic gas and molten resin so that the inorganic gas is enclosed in the molten resin; etc. The kneading operations are all effected in the extruder. As illustrative of the above-mentioned decomposable foaming agent, there may be mentioned azodicarbonamide, monosodium citrate, dinitrosopentamethylenetetramine, p,p'-oxybis(benzenesulfonyl hydrazide), diazoaminobenzene, azobisisobutyronitrile, paratoluenesulfonyl semicarbazide, benzenesulfonyl hydrizide, sodium hydrogencarbonate, etc. Exemplary volatile foaming agents may include aliphatic hydrocarbons such as propane, butane and hexane, alicyclic hydrocarbons such as cyclobutane and cyclopentane, halogenated hydrocarbons such as trichlorofluoromethane, dichlorodifluoromethane, dichlorotetrafluoroethane, methyl chloride, ethyl chloride and methylene chloride, and so on. On the other hand, illustrative of the void-forming agent may include clay, diatomaceous earth, talc, calcium carbonate, aluminum hydroxide, aluminum oxide and the like. When producing nucleocell-containing resin particles by using a decomposable foaming agent or volatile foaming agent, it is preferred to employ the foaming agent in such an amount that the resultant nucleocell-containing resin particles has a volume about 1.01–2.0 times, typically, 1.01–1.5 times the volume which the resin particles are supposed to have unless the nucleocells are formed therein. Among these various nucleocell-forming methods, it is particularly preferred to use a decomposable foaming agent. Such a decomposable foaming agent may preferably be used in an amount of 0.005–5 wt. %, or especially, 0.01–1.0 wt. %, both based on the corresponding resin. It is also feasible to use both decomposable foaming agent and void-forming agent in combination.

The existence of nucleocells is essential in the present invention. Without nucleocells, it is only possible to obtain pre-foamed particles with low expansion ratios. If one dares to obtain pre-foamed particles having a high expansion ratio without making use of nucleocells, there is no choice for him other than effecting the inorganic gas pressurization at an elevated pressure [for example, 60 kg/cm$^2$(G) or so]. This is certainly disadvantageous from the economical viewpoint.

As base materials of resin particles useful in the practice of this invention, there may be mentioned styrene-base resins such as styrene homopolymers, styrenemaleic anhydride copolymers, styrene-acrylonitrile copolymers and styrene-acrylonitrile-butadiene copolymers; and polyolefins such as ethylene homopolymers, propylene homopolymers, ethylene-propylene block copolymers, ethylene-propylene random copolymers. Of these base materials, polyolefins are preferred with low-density polyethylene and ethylene-propylene random copolymers being particularly preferred. They may be either crosslinked or not crosslinked.

In the present invention, resin particles containing nucleocells are dispersed in a dispersing medium in a closed vessel. Here, any dispersing medium may be employed so long as it does not dissolve the resin. As exemplary dispersing media, may be mentioned water, ethylene glycol, glycerin, methanol, ethanol and the like. These dispersing media may be used either singly or in combination. However, water is used usually. Upon dispersion of resin particles in such a dispersing medium, it may also be possible to add a dispersing agent such as fine aluminum oxide particles, fine titanium oxide particles, fine basic magnesium carbonate particles, fine basic zinc carbonate particles, fine calcium carbonate particles or the like as needed. The dispersing agent may usually be employed in an amount of 0.01–5 parts by weight per 100 parts by weight of resin particles.

In the present invention, the resin particles which have been dispersed in the dispersing medium in the closed vessel are then heated to a temperature of the softening point of the resin particles or higher. At the same time, an inorganic gas is fed into the vessel, whereby to hold the resin particles under an elevated pressure. As to the heating temperature, no particular problem or inconvenience will arise so long as it is above the temperature at which the resin particles are softened. However, the heating temperature may preferably be (the softening point of the resin particles +15° C.) or higher. Here, the term "softening point" as used herein means a value determined at a load of 4.6 kg/mm$^2$ in accordance with ASTM D643. As exemplary inorganic gases useful for the pressurization, there may be mentioned air, nitrogen, carbon dioxide, hydrogen, helium, neon, oxygen and so on. Two or more of these gases may be employed as a mixture. The pressure at which the resin particles are pressurized by the inorganic gas may be 10 kg/cm$^2$(G) or higher, or preferably, 25–40 kg/cm$^2$(G). The holding time of the resin particles at such an elevated pressure may be 1 minute or longer, or preferably, 5–15 minutes or longer.

Foaming ability can be imparted to the resin particles by heating the resin particles to a temperature of the softening point of the resin particles or higher and then holding the resin particles at the temperature while pressurizing same by an inorganic gas as mentioned above. Thereafter, by opening one end of the vessel to release the resin particles and dispersing medium into an atmosphere of a pressure lower than the internal pressure of the vessel (normally, atmospheric pressure), the resin particles are allowed to foam. During this releasing period, the internal pressure of the vessel is usually held at the same level as the internal pressure before the initiation of release of the resin particles. In the above manner, pre-foamed particles having an expansion ratio of 2–40 times can be obtained.

As has been described above, the present invention has made it possible with ease to impart foaming ability to resin particles by making use of resin particles containing nucleocells, dispersing the particles in a dispersing medium in a closed vessel, heating the contents to the softening point of the particles or higher and holding the particles under an elevated pressure with an inorganic gas. It has thus become feasible to produce good pre-foamed particles with ease and without failure.

The present invention has also made it possible to avoid all deleterious effects which will otherwise be given to resin particles due to the swelling action of their foaming agent.

This invention will hereinafter be described in further detail by the following Examples and Comparative Examples.

EXAMPLES 1-6

In an extruder, 100 parts by weight of an ethylene-propylene random copolymer (Vicat softening point: 124° C.) and the decomposable foaming agent or the decomposable foaming agent and void-forming agent, which are given in Table 1, were molten and kneaded. After extruding the resultant melt from the extruder, the extrudate was chopped to obtain resin particles. Cross-sectional areas of those resin particles were microscopically observed to determine whether nucleocells were contained or not. Observation results are also given in Table 1.

Then, 300 parts by weight of water and 1 part by weight of fine aluminum oxide particles as a dispersing agent were charged together with 100 parts by weight of the above resin particles into a closed vessel. After heating with stirring the contents to the temperature given in Table 2, the contents were kept pressurized at the pressure and for the time period, both given in the same table, with air. One end of the vessel was then opened to release the resin particles and water under atmospheric pressure, while maintaining the internal pressure of the vessel at the same level. Properties of the resulting pre-foamed particles are also shown in Table 2.

EXAMPLE 7

Added to 100 parts by weight of an ethylene-propylene random copolymer (Vicat softening point: 124° C.) were 20 parts by weight of talc. The resultant mixture was molten and kneaded in an extruder, followed by its extrusion and chopping to obtain resin particles. Cross-sectional areas of the thus-obtained resin particles were microscopically observed. Inclusion of nucleocells was confirmed.

Thereafter, the resin particles were charged together with water and fine aluminum oxide particles, both in the same amounts as those employed in Examples 1-6, into a closed vessel. The contents were heated and pressurized with stirring under the conditions given in Table 2, and were then released under atmospheric pressure. Properties of the thus-obtained pre-foamed particles are shown in Table 2.

COMPARATIVE EXAMPLES 1-2

After melting an ethylene-propylene random copolymer (Vicat softening point: 124° C.) in an extruder, the resultant melt was extruded and then chopped to obtain resin particles. Existence of nucleocells in the resin particles were not recognized.

Then, those resin particles were charged, with the same composition as in Examples 1-6, in a closed vessel. The contents were heated and pressurized under the conditions given in Table 2, followed by their release under atmospheric pressure. As shown in Table 2, they were not allowed to undergo any substantial foaming when the holding time under the elevated pressure was short. Even when held under the elevated pressure for the long period of time, the expansion ratio was far smaller than those of the pre-foamed particles obtained respectively in the Examples.

TABLE 1

| Example | Decomposable foaming agent Name | Amount* | Void-forming agent Name | Amount* | Existence of nucleocells |
|---|---|---|---|---|---|
| 1 | Monosodium citrate | 0.5 | — | — | Existed |
| 2 | Monosodium citrate | 0.7 | — | — | Existed |
| 3 | Monosodium citrate | 1.0 | — | — | Existed |
| 4 | Monosodium citrate | 0.5 | Talc | 1.0 | Existed |
| 5 | Azodicarbonamide | 0.5 | — | — | Existed |
| 6 | Azodicarbonamide | 0.5 | Diatomaceous earth | 1.0 | Existed |

*part by weight.

TABLE 2

| | Heating temp. (°C.) | Pressurizing pressure (kg/cm² · G) | Pressure-holding time (min.) | Properties of pre-foamed particles | | |
|---|---|---|---|---|---|---|
| | | | | Apparent expansion ratio | Type of cells* | Overall evaluation |
| Example | | | | | | |
| 1 | 145 | 30 | 20 | 5 | Closed cells | Acceptable |
| 2 | 145 | 30 | 20 | 7 | Closed cells | Acceptable |
| 3 | 145 | 30 | 20 | 14 | Closed cells | Acceptable |
| 4 | 145 | 30 | 20 | 17 | Closed cells | Acceptable |
| 5 | 145 | 30 | 20 | 5 | Closed cells | Acceptable |
| 6 | 145 | 30 | 20 | 16 | Closed cells | Acceptable |
| 7 | 150 | 30 | 30 | 13 | Closed cells | Acceptable |
| Comp. Ex. | | | | | | |
| 1 | 145 | 30 | 20 | Not foamed | — | Not Acceptable |
| 2 | 145 | 30 | 190 | 3.3 | Closed cells | Not Acceptable |

*Pre-foamed particles were cut and the resulting surfaces were microscopically observed.

We claim:

1. A process for producing pre-foamed particles, which comprises:
   dispersing resin particles, which contain nucleocells adapted to serve as nuclei for cells to be formed in the pre-foamed particles, in a dispersing medium in a closed vessel;
   heating the contents to a temperature of the softening point of the resin particles or higher and holding the contents at the temperature for a predetermined period of time while pressurizing the contents with an inorganic gas; and
   opening the vessel at one end thereof so as to release the thus-heated and pressurized resin particles and dispersing medium into an atmosphere of a pressure lower than the internal pressure of the vessel, thereby causing the thus-heated and pressurized resin particles to foam.

2. The process according to claim 1, wherein the nucleocell-containing resin particles are resin particles containing nucleocells formed by kneading a resin together with from 0.005 to 5 weight percent, based on the resin, of a decomposable foaming agent at a temperature of the decomposition temperature of the decomposable foaming agent or higher in an extruder so as to decompose the decomposable foaming agent partly or in its entirety when extruding and pelletizing the resin from the extruder to produce the resin particles.

3. The process according to claim 1, wherein the nucleocell-containing resin particles are resin particles containing nucleocells formed by kneading a resin and a volatile foaming agent in an extruder to gasify the volatile foaming agent when extruding and pelletizing the resin from the extruder to produce the resin particles.

4. The process according to claim 1, wherein the nucleocell-containing resin particles are resin particles containing nucleocells formed by adding and kneading a void-forming agent with a resin in an extruder when extruding and pelletizing the resin from the extruder to produce the resin particles.

5. The process according to claim 1, wherein the nucleocell-containing resin particles are resin particles containing nucleocells formed by adding and kneading pre-foamed particles or foamed and molded articles with a resin in an extruder when extruding and pelletizing the resin from the extruder to produce the resin particles.

6. The process according to claim 1, wherein the nucleocell-containing resin particles are resin particles containing nucleocells formed by feeding an inorganic gas such as air or nitrogen gas to a molten resin and kneading the inorganic gas and molten resin to make the molten resin enclose bubbles of the inorganic gas therein in an extruder when extruding and pelletizing the molten resin from the extruder to produce the resin particles.

7. The process according to claim 1, wherein nucleocell-containing resin particles are resin particles containing nucleocells formed by kneading a decomposable foaming agent together with a resin at a temperature of the decomposition temperature of the decomposable foaming agent or higher so as to allow the decomposable foaming agent to decompose partly or in its entirety and also by adding and kneading a void-forming agent with the resin, both in an extruder, when extruding and pelletizing the resin from the extruder to produce the resin particles.

8. The process according to claim 2, wherein the decomposable foaming agent is used in such an amount that after the formation of nucleocells, the volume of the resin particles reaches 1.01–2.0 times the volume of the resin particles before the formation of the nucleocells.

9. The process according to claim 2 or 8, wherein the decomposable foaming agent is used in an amount of 0.001–1 wt. % based on the resin.

10. The process according to claim 3 wherein the volatile foaming agent is used in such an amount that after the formation of nucleocells, the volume of the resin particles reaches 0.01–2.0 times the volume of the resin particles before the formation of the nucleocells.

11. The process according to claim 1 wherein the nucleocell-containing resin particles are obtained by kneading a mixture of the resin and a nucleocell-forming agent in an extruder, extruding the mixture and pelletizing the resultant extrudate.

12. The process according to claim 2 wherein the decomposable foaming agent is selected from the group consisting of azodicarbonamide, monosodium citrate, dinitrosopentamethylenetetramine, p,p'-oxybis(benzenesulfonyl hydrazide), diazoaminobenzene, azobisisobutyronitrile, paratoluenesulfonyl semicarbazide, benzenesulfonyl hydrazide, and sodium hydrogencarbonate.

13. The process according to claim 1 or claim 2 wherein the resin particles are fabricated from a styrene resin or a polyolefin.

14. The process according to claim 13 wherein the resin particle is fabricated from a polyolefin selected from the group consisting of ethylene homopolymer, propylene homopolymers, ethylene-propylene block copolymers, and ethylene-propylene random copolymers.

15. The process according to claim 13 wherein the polyolefin is an ethylene-propylene random copolymer.

16. The process according to claim 1 wherein the dispersing medium comprises water.

17. The process according to claim 1 wherein the dispersing medium further comprises from about 0.01–5 parts by weight per 100 parts by weight of resin particles of a finely divided dispersing agent.

18. The process of claim 1 wherein the inorganic gas for pressurizing the contents of the closed vessel is air.

19. The process according to claim 18 wherein the contents are pressurized to a pressure of from 25 to 40 $kg/cm^2(G)$.

* * * * *